Patented Nov. 9, 1926.

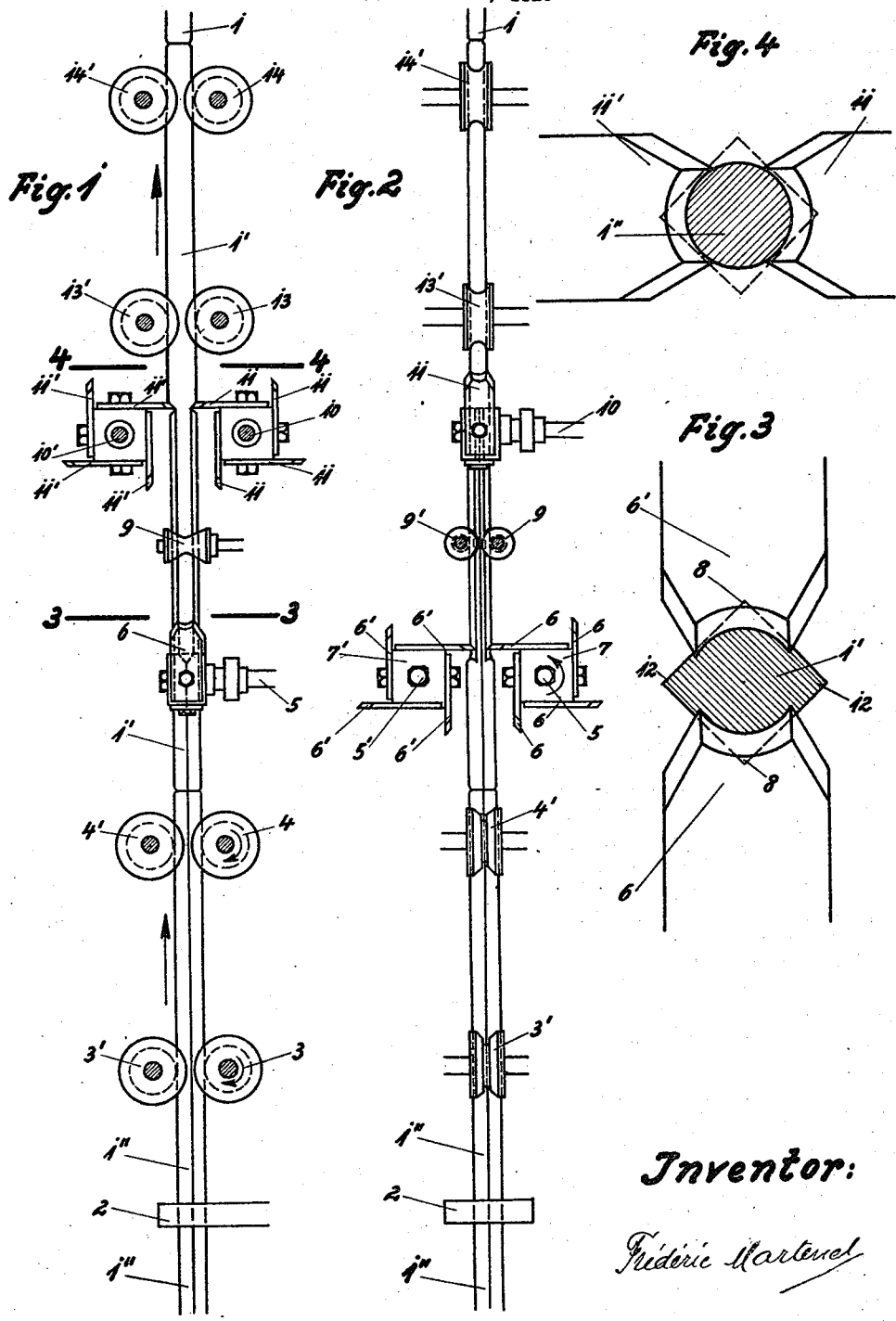

1,606,313

UNITED STATES PATENT OFFICE.

FRÉDÉRIC MARTENET, OF VAUSEYON/NEUCHATEL, SWITZERLAND.

WOOD-SHAPING MACHINE.

Application filed October 21, 1925, Serial No. 63,916, and in Switzerland April 20, 1925.

My invention relates to a wood shaping machine of the kind in which a rod is fed axially between revolving cutters, and the invention consists in arranging several pairs of roller guides alternately with pairs of cutters, the latter being arranged so as to act on the rod from different diametral positions.

Fig. 1 of the accompanying drawings represents a side view of the arrangement, and Fig. 2, a plan of the same.

Fig. 3 is a cross-section on the line 3—3 of Fig. 1 on an enlarged scale, and

Fig. 4, a similar cross-section on the line 4—4.

The machine is provided with a plurality of spaced roller guides which are arranged in alignment so that they can guide a train of rods 1, 1', 1'' through the machine, the rods being admitted to the first roller pair through a rigid guide 2. In the arrangement shown in the drawings, the rollers 3, 4, 9, 13 and 14 are feed rollers and are therefore positively rotated, while the rollers 3', 4', 9', 13' and 14' are merely couch rollers which co-operate with the feed rollers and press the rods against the latter. The revolving cutters are arranged in pairs alternately with the roller guides, the shaft of each pair being situated in a plane at right angles to the rods. The angular position of the shafts in the different pairs, however, is varied so that the cutters act on the rod from different diametral positions. In the device shown, one pair of cutter shafts 5, 5' is arranged at right angles to another pair 10, 10'. Thus, if round rods are to be produced out of square ones, the first pair of cutters remove the corners 8 of the square rods, and the remaining corners 12 are removed by the succeeding pair. The feed and couch rollers are shaped in conformity with the contours of the rod portions to which they are applied. Naturally other than round rod shapes may be produced, the cutters and rollers being shaped to correspond, and any desired number of cutter pairs, arranged at different angles about the rod, may be employed. The feed and couch rollers are arranged with their axes parallel to the cutter shafts which immediately precede them. In the construction shown, therefore, the rollers 9, 9' are arranged at right angles to the rollers 13, 13'.

The cutters shown in the drawings are composed of blades 6, 6', 11, 11' which are secured to the sides of square blocks 7, 7', the latter being keyed to the shafts 5, 5', 10, 10'. The cutter blades may be adjusted on the block for rods of different thicknesses, and they may also be exchanged for blades of different shapes. The feed and couch rollers are also adjustable and exchangeable.

The cutters are rotated against the travelling direction of the rods.

I claim:

The combination in a wood shaping mechine with rotatable cutter shafts, the shafts being arranged so that different pairs of cutters act on the rods from different diametral positions, said cutters having their cutting ends tapered in width to an intermediate re-entrant curved portion and having a bevel cutting edge uniform and extending the full width including the tapered portion.

In testimony whereof I affix my signature.

FRÉDÉRIC MARTENET.